(12) United States Patent
Sakurai et al.

(10) Patent No.: US 6,534,935 B1
(45) Date of Patent: Mar. 18, 2003

(54) COLOR CRT APPARATUS

(75) Inventors: Hiroshi Sakurai, Osaka (JP); Etsuji Tagami, Osaka (JP); Hiromi Wakasono, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 294 days.

(21) Appl. No.: 09/689,141

(22) Filed: Oct. 12, 2000

(30) Foreign Application Priority Data

Oct. 21, 1999 (JP) .......................... 11-299680
Jul. 14, 2000 (JP) ....................... 2000-214069

(51) Int. Cl.[7] ............................................. H01J 29/72
(52) U.S. Cl. ..................................................... 315/364
(58) Field of Search ............................... 315/364, 370, 315/371

(56) References Cited

U.S. PATENT DOCUMENTS

| | | | | |
|---|---|---|---|---|
| 2,764,628 A | | 9/1956 | Bambara | 178/5.4 |
| 4,634,923 A | * | 1/1987 | Alig | 313/413 |
| 5,448,140 A | * | 9/1995 | Douken et al. | 315/371 |
| 5,777,429 A | * | 7/1998 | Headley | 313/440 |
| 5,861,710 A | * | 1/1999 | Uchida et al. | 313/440 |

FOREIGN PATENT DOCUMENTS

| | | |
|---|---|---|
| EP | 0-203765 | 12/1986 |
| EP | 0-212934 | 3/1987 |
| EP | 0-271906 | 6/1988 |
| JP | 54-29227 B2 | 9/1979 |
| JP | 55-671 | 1/1980 |
| JP | 6-28140 | 4/1994 |
| JP | 6-46812 | 6/1994 |
| JP | 2542592 B2 | 7/1996 |

OTHER PUBLICATIONS

NHK Color Television Textbook, vol. 1, pp 266–271 and the partial English Translation.

* cited by examiner

*Primary Examiner*—Robert H. Kim
*Assistant Examiner*—Jurie Yun
(74) *Attorney, Agent, or Firm*—Merchant & Gould, P.C.

(57) ABSTRACT

In a color CRT apparatus in which three electron beams are not superimposed on one point on the screen at a time, a time difference is applied to modulating signals corresponding to the respective electron beams to adjust phase, thus achieving convergence of images, the screen is flat, both a horizontal magnetic deflection field and a vertical magnetic deflection field have uniform magnetic field distribution, paths of both side electron beams and a path of the center electron beam of the three electron beams emitted from electron sources are approximately parallel, and the time difference applied to the modulating signals is set to be approximately constant throughout the screen. Thus, images formed of imaging spots of the three electron beams can be superimposed on the screen with high precision to be matched without causing increased cost.

18 Claims, 15 Drawing Sheets

COLOR CRT APPARATUS

BACKGROUND OF THE INVENTION

1. Field of the Invention

The present invention relates generally to a color CRT (cathode-ray tube) apparatus.

2. Related Background Art

A color CRT apparatus forms color images by superposing images with three colors of R (red), G (green), and B (Blue) on a screen. For an imaging device, it is necessary to perform this superposition, i.e. convergence with high precision.

In a conventional color CRT, generally, three electron sources corresponding to the three colors R, G, and B are arranged in parallel, and angles of respective paths of electron beams on both sides of a center beam (herein after referred to simply as "side electron beams") with respect to a path of the center electron beam have been set so that the distance between becomes smaller gradually in the direction in which the electron beams travel, and imaging spots of the three electron beams emitted at an interval s between respective adjacent electron beams are superimposed on one point on the screen. In this case, since the distance from an electron gun to the periphery of the screen is longer than that from the electron gun to the center of the screen, when the angles are set so that the imaging spots of the three electron beams are superimposed on one point at the center of the screen, the conventional color CRT is designed so that the imaging spots of the three electron beams are superimposed on one point continually throughout the screen using means for easing the degrees (for reducing the angles) to which side electron beams are directed outward, according to the distance from the center of the screen (according to the deflection amount of the electron beams).

Such means are roughly divided into three specific means. The respective means are described briefly as follows.

A first specific means is called a "self-convergence system" and basically is a method of providing nonuniformity to magnetic deflection field distribution. In a general example, a horizontal magnetic deflection field is provided with pincushion magnetic field distribution and a vertical magnetic deflection field is provided with barrel magnetic field distribution. The magnetic field distributions are designed so that imaging spots of three electron beams are superimposed on one point continually throughout the screen by causing a difference in deflection amount of the respective electron beams in the trajectory where the electron beams pass through the magnetic deflection fields while the intervals between respective adjacent electron beams of the three electron beams are the same at the moment they are emitted from an electron gun (for example, NHK (Japan Broadcasting Association) Color Television Textbook, Vol. 1, pages 267 to 271).

A second specific means is referred to as "dynamic convergence". In the dynamic convergence, a magnetic field (a magnetic dynamic convergence field) for dynamically changing the angles of side electron beams with respect to the center electron beam is provided in the vicinity of main lenses of an electron gun and the strength of the magnetic field is varied according to an intended deflection amount, thus making adjustment so that imaging spots of the three electron beams are superimposed on one point continually throughout the screen (for example, NHK Color Television Textbook, Vol. 1, pages 266 to 267).

A third specific means employs a picture signal circuit (for instance, U.S. Pat. No. 2,764,628) constructed as follows. Three electron beams are not necessarily superimposed on one point on the screen, and side electron beams are set to be directed slightly inward or approximately in parallel. Spatial differences among images with three colors R, G, and B on the screen are corrected by temporal differences in input timings of modulating signals input to electron sources for the respective electron beams, thus allowing images formed of imaging spots of the three electron beams to be superimposed to be matched apparently throughout the screen. For convenience, such a means is referred to as "signal phase convergence" in the present specification.

Among those means, the first specific means has been used most widely. However, since the display density of image information has increased rapidly in recent years, it has become difficult to superimpose imaging spots of three electron beams with sufficiently high precision merely using the design of the above-mentioned magnetic field distributions. On the other hand, there are demands for reducing the depth of a color CRT apparatus. When the depth is to be reduced, the deflection angle increases. Therefore, the difference between the distance from the electron gun to the center of the screen and that from the electron gun to the periphery of the screen is increased further. Consequently, it has become more difficult to superimpose the imaging spots of three electron beams with high precision.

Therefore, the second specific means or a specific means of the combination of the first and second specific means has come to be used. In such a means, however, the three imaging spots are not always aligned on a straight line and are displaced irregularly. Therefore, a complicated system is required for correcting the irregular displacement, resulting in cost increase, which has been a disadvantage.

The third specific means basically achieves the convergence using a picture signal circuit. This is not a general technique, but the possibility of achieving this has increased with the improvement in digital circuit (for instance, JP 2542592 B). In this technique, the time difference corresponding to the displacement amount of the three imaging spots, which is different depending on positions on the screen, is applied to picture signals using a circuit technique, thus achieving the convergence throughout the screen. However, when this is achieved using the circuit technique alone, loads on the circuit increase, which include, for example, storage of the amounts of correction in signal phase at each position on the screen in a memory. Consequently, costs of the circuit and for its adjustment increase, which has been a disadvantage.

Some specific means of the combination of the first and third specific means also have been studied (for example, JP 54-29227 B and JP 6-46812 B). Basically, however, their designs are complicated, and naturally, there has been a limitation in coping with the increased display density and the increased deflection angle.

Of course, a specific means of the combination of the second and third specific means also can be considered as one combination. In this case, however, such a specific means comes to have both the disadvantages of the second and third specific means. In other words, such a specific means comes to have both the complicated correction system in the dynamic convergence and the increased load on the circuit due to the signal phase convergence. Therefore, such a specific means does not have much point and thus has not been studied.

SUMMARY OF THE INVENTION

The present invention is intended to cope sufficiently with the increased display density of image information and the increased deflection angle due to the reduction in depth by improving one obtained basically by combining elements of the above-mentioned second and third specific means and adding specific conditions thereto, by which images formed of imaging spots of three electron beams are superimposed on a screen with a sufficiently high precision to be matched without causing a cost increase.

In order to solve the above-mentioned problems, a first color CRT apparatus of the present invention employs the following system. In the system, three electron beams emitted from three electron sources arranged in an in-line form in a horizontal direction corresponding to three colors R, G, and B are deflected by a horizontal magnetic deflection field and a vertical magnetic deflection field, imaging spots of the three electron beams that are not superimposed on one point on a screen at a time are formed, and according to a time difference in timings at which the three electron beams scan the same one point on the screen, respectively, a time difference is applied to input timings of modulating signals for the respective electron beams to form color images on the screen. In the first color CRT apparatus, the screen is substantially flat, both the horizontal magnetic deflection field and the vertical magnetic deflection field have substantially uniform magnetic field distribution, respective paths of the side electron beams and a path of the center electron beam are approximately parallel to each other when the electron beams enter a magnetic deflection field area, and the time difference applied to the input timings of the modulating signals is approximately constant throughout the screen.

According to this, the images formed of imaging spots of the three electron beams are superimposed on the screen to be matched easily. Thus, it is possible to cope sufficiently with the increased display density of image information and the increased deflection angle due to the reduction in depth.

A second color CRT apparatus of the present invention employs the following system. In the system, three electron beams emitted from three electron sources arranged in an in-line form in a horizontal direction corresponding to three colors R, G, and B are deflected by a horizontal magnetic deflection field and a vertical magnetic deflection field, imaging spots of the three electron beams that are not superimposed on one point on a screen at a time are formed, and according to a time difference in timings at which the three electron beams scan the same one point on the screen, respectively, a time difference is applied to input timings of modulating signals for the respective electron beams to form color images on the screen. In the second color CRT apparatus, the screen is approximately flat, both the horizontal magnetic deflection field and the vertical magnetic deflection field have approximately uniform magnetic field distribution, and adjustment is made so that the imaging spots of the three electron beams on the screen at a time are positioned continually at a certain interval in a horizontal direction by allowing paths of the side electron beams and a path of the center electron beam to be approximately parallel to each other when the electron beams enter the magnetic deflection field area and the vertical magnetic deflection field is not generated and by increasing, according to strength of the vertical magnetic deflection field, intervals between the respective paths of the side electron beams and the path of the center electron beam when the electron beams enter the magnetic deflection field area and the vertical magnetic deflection field is generated.

According to this, the images formed of imaging spots of the three electron beams are superimposed on the screen with a sufficiently high precision to be matched without causing a cost increase. Thus, it is possible to cope sufficiently with the increased display density of image information and the increased deflection angle due to the reduction in depth.

In the color CRT apparatuses of the present invention, an electron gun may be designed so that the paths of the three electron beams inside the electron gun are approximately parallel to one another.

According to this, lens performance of the electron gun, particularly for the side beams can be improved.

Alternatively, even when the three electron beams inside the electron gun are not always parallel, a quadrupole magnetic field may be provided in the space between the screen and main lenses of the electron gun in the vicinity of the main lenses and may be adjusted statically so that the paths of the three electron beams entering the magnetic deflection field area are parallel to one another when the vertical magnetic deflection field is not generated.

In this case, a conventional electron gun can be used without any modification.

In this case, it is preferable that the quadrupole magnetic field includes a first quadrupole magnetic field and a second quadrupole magnetic field, which are provided sequentially in the space between the screen and the main lenses of the electron gun in the vicinity of the main lenses, the first quadrupole magnetic field bends the paths of the side electron beams of the three electron beams inward, and the second quadrupole magnetic field allows the paths of the three electron beams to be parallel to one another.

This prevents neck shadow from appearing easily.

In this case, further a third quadrupole magnetic field may be provided in the vicinity of the first quadrupole magnetic field or the second quadrupole magnetic field to bend the paths of the side electron beams inward or outward, or a quadrupole electrostatic lens may be provided inside the electron gun to bend the paths of the side electron beams inward or outward.

According to this, unbalance between the horizontal and vertical forces with respect to focusing action or lens magnification for imaging of the three electron beams can be corrected.

In the second color CRT apparatus of the present invention, it is preferable that a quadrupole magnetic field generated by electromagnetic coils is provided in the space between the screen and the main lenses of the electron gun in the vicinity of the main lenses and is adjusted dynamically so that when the vertical magnetic deflection field is generated, the intervals between the respective paths of the side electron beams and the path of the center electron beam entering the magnetic deflection field area are increased according to the strength of the vertical magnetic deflection field.

According to this, fine adjustment of the intervals between respective adjacent beams can be made so that the imaging spots of the three electron beams on the screen at a time can be positioned continually at a certain interval in the horizontal direction.

In the second color CRT apparatus of the present invention, it is preferable that a quadrupole magnetic field generated by electromagnetic coils is provided between the first quadrupole magnetic field and the second quadrupole magnetic field and is adjusted dynamically so that when the vertical magnetic deflection field is generated, the intervals between the respective paths of the side electron beams and the path of the center electron beam entering the magnetic deflection field area are increased according to the strength of the vertical magnetic deflection field.

According to this, besides the fine adjustment of the intervals between respective adjacent beams, the space between the first quadrupole magnetic field and the second quadrupole magnetic field can be set to be wide.

In the color CRT apparatuses of the present invention, it is preferable that raster distortion in the color images is corrected by the uniform magnetic field distribution or by an auxiliary magnetic field provided for the uniform magnetic field distribution in an auxiliary manner.

According to this, the raster distortion can be corrected without disturbing the convergence.

In the color CRT apparatuses of the present invention, it is preferable that the time difference in the input timings is adjusted according to variations in current level of the electron beams.

According to this, it is possible to make fine adjustment of the variations in intervals between respective adjacent imaging spots of the three electron beams on the screen caused by the occurrence of repulsion between electron beams (interelectronic repulsion) according to the variations in current value. Therefore, independent of the current value, the imaging spots of the three electron beams on the screen at a time can be positioned at a desired interval.

Furthermore, in the color CRT apparatuses of the present invention, geometric variations with the passage of time including those in size, linearity and shift of the raster in the color images may be detected with a sensor and the time difference in the input timings may be adjusted according to the amount of the variations.

According to this, the convergence can be prevented from being disturbed, even when the variations in size, linearity, and shift of the raster is caused with the passage of time.

In addition, in the color CRT apparatuses of the present invention, the time difference in the input timings may be adjusted according to settings of a field frequency and/or the number of pixels of display data of the color images.

According to this, the convergence can be prevented from being disturbed, even when the setting of the number of pixels of display data of the color images is changed.

DETAILED DESCRIPTION OF THE INVENTION

Embodiments of the present invention are described as follows.

First Embodiment

Figure 1:
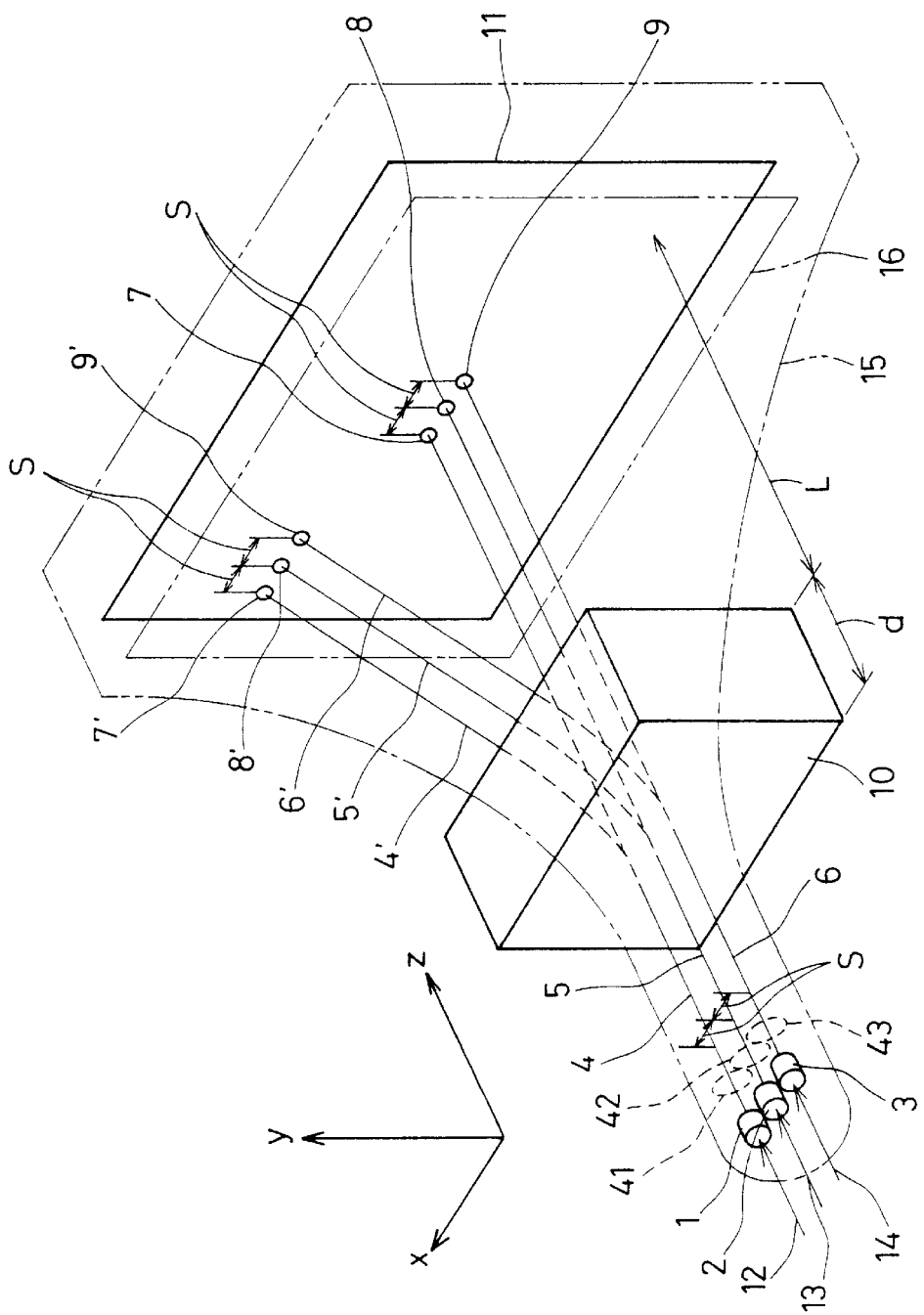
FIG. 1 is a structural view of a color CRT apparatus according to a first embodiment of the present invention.

FIG. 1 is a structural view illustrating the principle of a color CRT apparatus according to a first embodiment of the present invention.

The principle of the color CRT apparatus according to the present embodiment includes: an electron gun (whose whole view is not shown in the figure) having an electron source 1 corresponding to R, an electron source 2 corresponding to G, an electron source 3 corresponding to B, and a plurality of electrodes (not shown in the figure); electron beams 4, 5, and 6 corresponding to R, G, and B, respectively; imaging spots 7, 8, and 9; a magnetic deflection field area 10 with perfectly uniform magnetic field distribution; a perfectly flat screen 11; and modulating signals 12, 13, and 14. All paths of the electron beams are maintained in a vacuum by a vacuum vessel 15. The electron sources 1, 2, and 3 correspond to three cathodes of an in-line electron gun. The electron beams 4, 5, and 6 emitted from the electron sources 1, 2, and 3 are focused by main lenses 41, 42, and 43 formed by potential differences in the electrodes of the electron gun. Electron beams and imaging spots obtained when the electron beams 4, 5, and 6 are deflected in the magnetic deflection field area 10 with the perfectly uniform magnetic field distribution are shown with electron beams 4', 5', and 6' and imaging spots 7', 8', and 9'. Besides the above, a shadow mask 16 indicated with a broken line is included, but is not necessary in explaining the principle. Therefore, the detailed description of the shadow mask 16 is omitted.

The following description is directed to the principle of the basic operation under such ideal conditions as described above. The electron beams 4, 5, and 6 emitted in the z direction from the electron sources 1, 2, 3 placed parallel to one another in the x direction (horizontally) are positioned in parallel to one another at an interval s. When the magnetic field in the magnetic deflection field area 10 with the perfectly uniform magnetic field distribution is set to be zero, the electron beams 4, 5, and 6 reach the perfectly flat screen 11 formed in an x-y plane without being deflected, thus forming imaging spots 7, 8, and 9 at an interval s in the x direction. When the imaging spot 8 of G is indicated with the respective coordinate points (x, y) and is set to be (0, 0), the imaging spot 7 of R is (s, 0) and the imaging spot 9 of B is (-s, 0). In this case, the luminance of the respective imaging spots is controlled by the modulating signals 12, 13, and 14 input to the electron sources 1, 2, and 3. When an arbitrary horizontal magnetic deflection field and vertical magnetic deflection field (not shown in the figure) are generated in the magnetic deflection field area 10 with the perfectly uniform magnetic field distribution, the electron beams 4, 5, and 6 are deflected in the x and y directions inside the area to travel on the paths of the electron beams 4', 5', and 6' and thus forming the imaging spots 7', 8', and 9' on the perfectly flat screen 11. In this case, the coordinate points of the imaging spot 7' of R are expressed by the following formulae.

$$x = Rx\left\{(1 - \cos\theta) + \frac{\omega}{v_z} \cdot L \cdot \tan\theta\right\} + s \quad (1)$$

$$y = Ry\left\{(1 - \cos\theta) + \frac{\omega}{v_z} \cdot L \cdot \tan\theta\right\} \quad (2)$$

In the above formulae, the followings hold.

$$Rx = \frac{e}{m} \cdot \frac{By}{\omega^2} \cdot v_z$$

$$Ry = -\frac{e}{m} \cdot \frac{Bx}{\omega^2} \cdot v_z$$

$$\omega = \frac{e}{m}\sqrt{Bx^2 + By^2}$$

$$\theta = \sin^{-1}\left(\frac{d}{\sqrt{Rx^2 + Ry^2}}\right)$$

In the above formulae, e denotes elementary electric charge, m electron mass, Bx magnetic flux density of the vertical magnetic deflection field, By magnetic flux density of the horizontal magnetic deflection field, $v_z$ initial velocity of electrons in the z direction when the electrons rush into the magnetic deflection field area 10, d the length of the magnetic deflection field area 10 in the z direction, and L the distance from the magnetic deflection field area 10 to the screen 11 in the z direction.

Figure 2A:
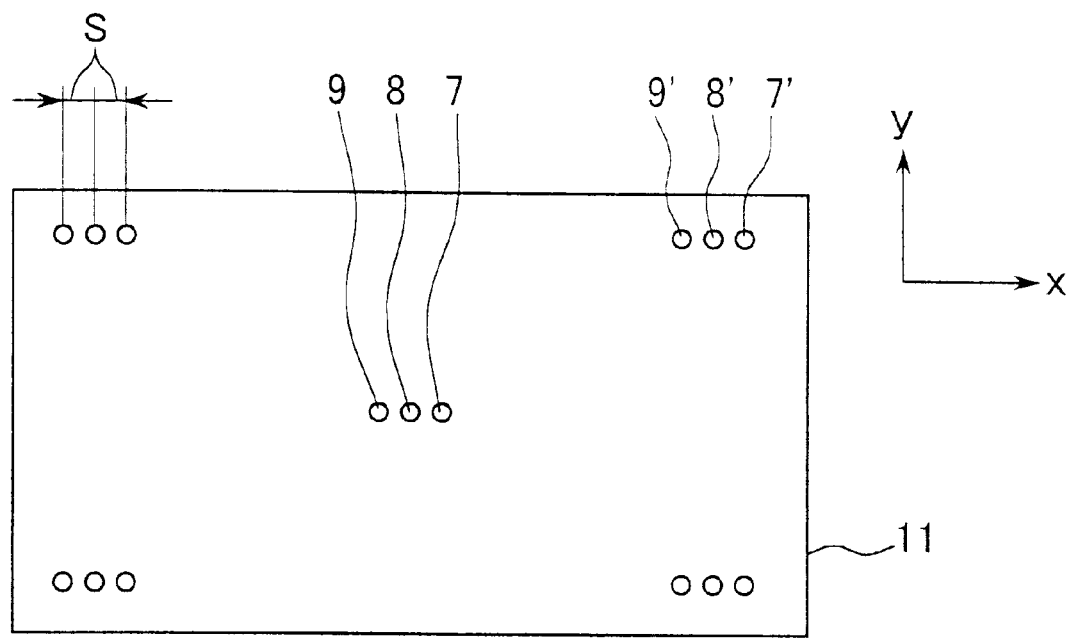
FIG. 2A is a front view illustrating imaging spots of electron beams on a screen of the color CRT apparatus according to the first embodiment of the present invention.
Figure 2B:
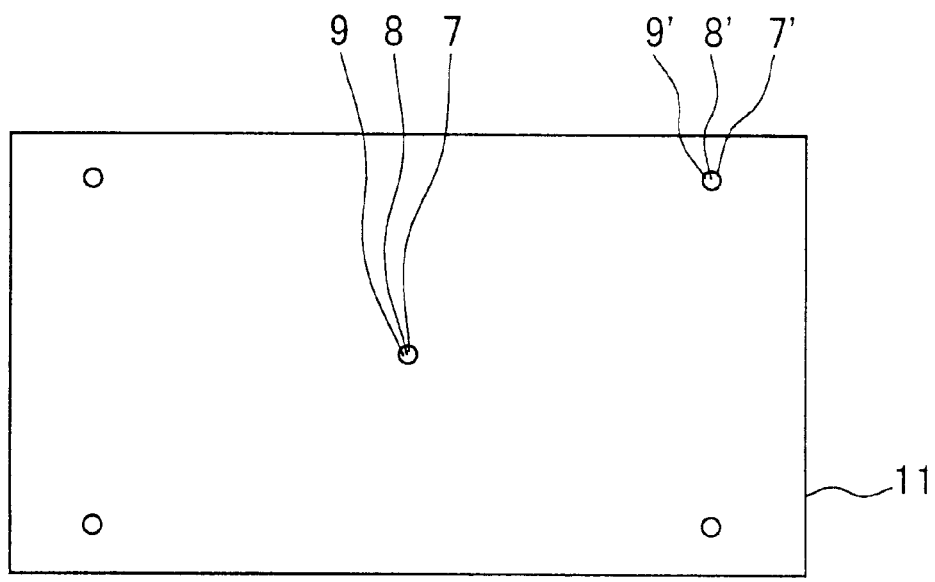
FIG. 2B is a conceptual front view illustrating the case where the signal phase convergence is performed.

In the above, attention should be paid to the member of "+s", at the right end in the formula (1). This member becomes 0 in the case of the imaging spot 8' and -s in the case of the imaging spot 9'. The formula (2) does not include the member of "S". This means that the coordinate points of the arbitrary imaging spots 7', 8', and 9' when electron beams are deflected are aligned linearly in the x direction at an interval s continually. FIG. 2A shows such a manner schematically. Since the imaging spots are not displaced in the y direction, convergence with high precision can be achieved easily as shown in FIG. 2B merely by correcting the amounts s of displacement of the respective images in the x direction through a certain amount of shift in input timings of modulating signals 12, 13, and 14. For instance, in a picture signal circuit, when the signal of R is set as a reference, the signal of G is delayed in timing with respect to the reference, and the signal of B further is delayed in timing with respect to the signal of G. In order to delay the signals, a delay circuit may be used, or a readout clock in a line memory may be delayed in the case of a digital signal processing. Such specific means are disclosed in, for example, JP 55-671 A and JP 2542592 B.

Figure 3A:
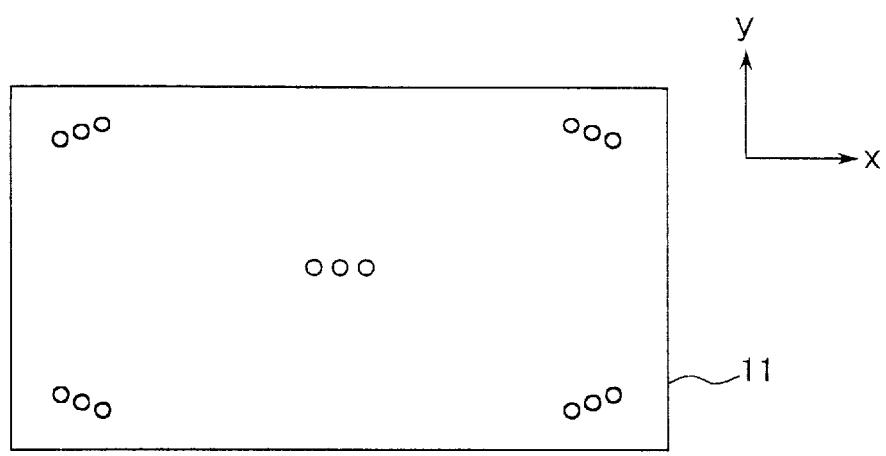
FIGS. 3A, 3B, and 3C are front views illustrating imaging spots of electron beams on a screen when principle conditions according to the first embodiment of the present invention are not satisfied.
Figure 3B:
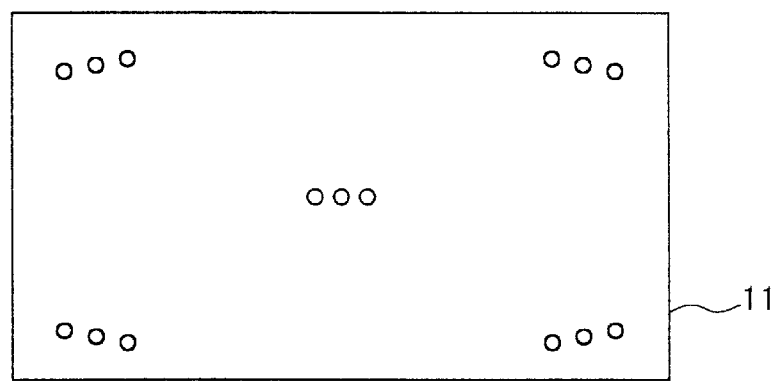
Figure 3C:
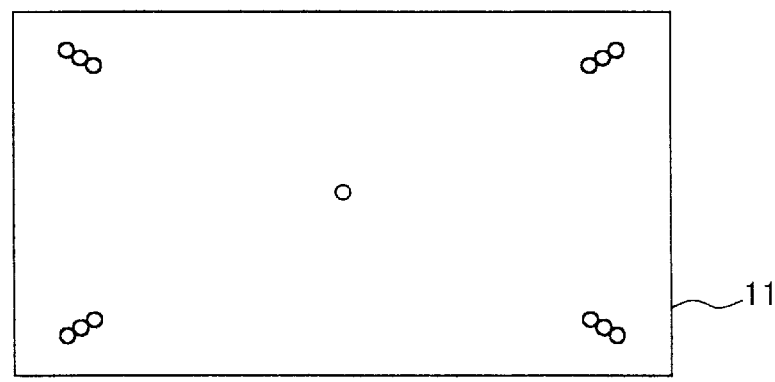

Such phenomena can occur only when the screen 11 is perfectly flat, the magnetic field distribution of the magnetic deflection field area 10 is perfectly uniform, and the paths of the electron beams 4, 5, and 6 are parallel to one another when not being deflected. When even one of these three conditions fails, the formulae (1) and (2) come to be indicated as complicated functions of s. Therefore, the positional relationship among the arbitrary imaging spots 7', 8', and 9' when electron beams are deflected is changed by the variations in interval in the x and y directions. This change in the positional relationship is shown schematically in FIGS. 3A, 3B, and 3C. For example, the state shown in FIG. 3A is caused when the screen 11 is not perfectly flat. The state shown in FIG. 3B is caused when the magnetic deflection field area 10 does not have uniform magnetic field distribution, the horizontal magnetic field has a pincushion magnetic field distribution, and the vertical magnetic field is a barrel magnetic field. The state shown in FIG. 3C is caused when the paths of the undeflected electron beams 4, 5, and 6 are not parallel to one another and cross at the center of the screen 11. In order to achieve the convergence under such states, dynamic corrections synchronized with the deflection in the x and y directions are required for the each case. With respect to the x direction, the load on the circuit increases. With respect to the y direction, since the correction cannot be made using signal phase alone, a complicated correction corresponding to the usual dynamic convergence is required.

Theoretically, the above-mentioned "perfectly uniform magnetic field" denotes a magnetic field in which when the horizontal direction, the vertical direction, and the direction of a tube axis are indicated with x, y, and z, respectively, and vector components of the magnetic deflection field strength corresponding to the respective directions are indicated with Bx, By, and Bz, with respect to the magnetic deflection field strength in an x-y plane at arbitrary positions on the z axis, the respective Bxs are equal to one another, the respective Bys also are equal to one another, and the Bzs are approximately zero at the positions where the three electron beams pass. In this case, the Bxs and Bys may be varied with respect to the displacement in the z direction while satisfying the condition described above. In the formulae (1) and (2), Bx and By are indicated with constants, but may be functions of z. Furthermore, even if the magnetic field is not perfectly uniform in an exact sense, the magnetic field is acceptable as long as its direction and strength are not clearly different with respect to the behavior of the respective three electron beams at every point on the screen.

Practically, the length of a deflection yoke in the z direction is limited and a pair of coils constructing the deflection yoke are not positioned in parallel to each other but are positioned to have a larger space therebetween on the screen side compared to the space therebetween on the opposite side. Consequently, distortion components tend to be generated easily. For instance, under the situation where the magnitudes of Bx and By vary with respect to the displacement in the z direction, it is difficult to obtain a perfectly uniform magnetic field with the Bz being zero merely by the design change in shape of the deflection yoke or magnetic field distribution. However, when, for example, an auxiliary magnetic field for superposing a magnetic field for canceling the Bz is used, it is possible to obtain an approximately perfectly uniform magnetic field as a result.

The above-mentioned principle of the present invention is directed to ideal conditions. The following description is directed to practical conditions. With respect to the electron beams, when the imaging spots 7, 8, and 9 are positioned at an interval of s±1 mm or less, no practical problem is caused even if the paths of the undeflected electron beams 4, 5, and 6 are not exactly parallel to one another. With respect to the screen 11, even if it is not perfectly flat but has a slightly spherical or cylindrical surface, the above-mentioned principle holds in practical use when the screen 11 has a flatness with a curvature of at least 1000R. In this case, 1R=(the maximum diagonal outer diameter (mm)/25.4)×41.

With respect to the magnetic field distribution of the magnetic deflection field area 10, it is difficult to obtain a perfectly uniform magnetic field as described above. In this connection, a magnetic deflection field distribution referred to as a "uniform magnetic field" has been known conventionally. This, however, means that it is not the one obtained by providing nonuniformity for the magnetic field distribution intentionally as in the magnetic deflection field in the self-convergence system. This, therefore, should be distinguished clearly from the above-mentioned perfectly uniform magnetic field in the present invention. This aspect is described further as follows.

Figure 4A:
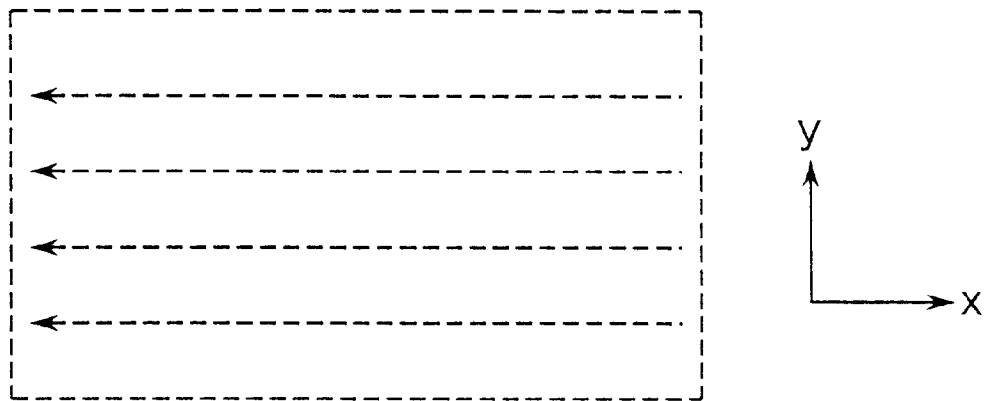
FIGS. 4A and 4B are drawings illustrating magnetic field distribution at an x-y cross-section of a vertical magnetic deflection field and a horizontal magnetic deflection field in a deflection area according to the first embodiment of the present invention, respectively.
Figure 4B:
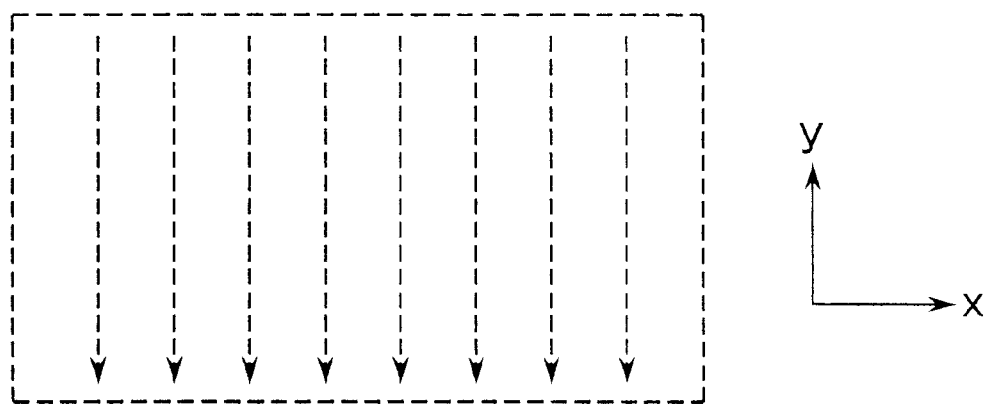

FIGS. 4A and 4B show the x-y cross section in the magnetic deflection field area, where electron beams pass through, with respect to the magnetic field distribution of the magnetic deflection field, which has been called a "uniform magnetic field" conventionally. FIG. 4A shows a vertical magnetic deflection field, and FIG. 4B a horizontal magnetic deflection field. In both the fields, lines of magnetic force are straight and are equally spaced, which satisfy the ideal conditions of the above-mentioned principle. In other words, in this aspect, the conventional uniform magnetic field is the same as the above-mentioned perfectly uniform magnetic field.

Figure 5:
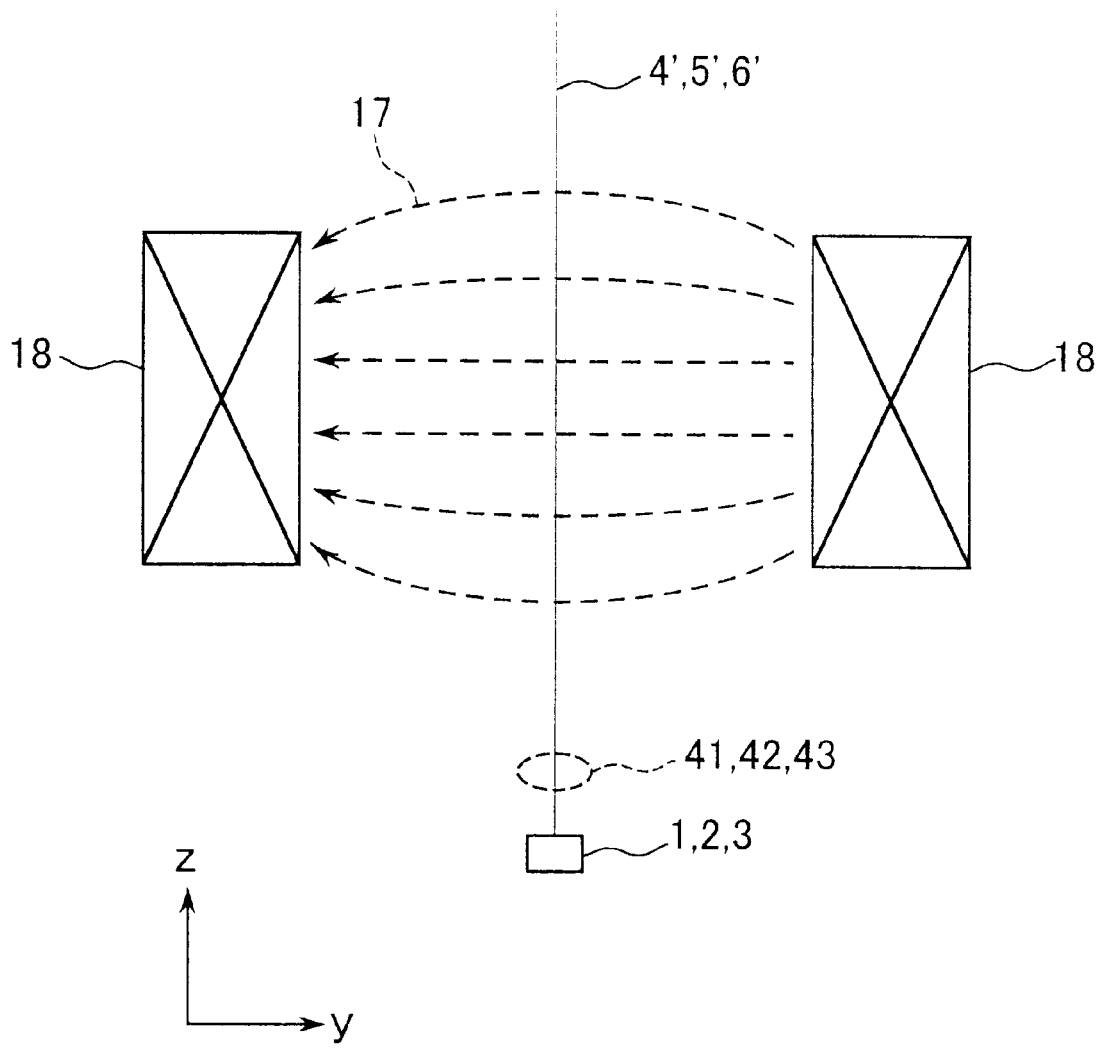
FIG. 5 is a drawing illustrating electron beam paths and magnetic field distribution at a y-z cross-section in the deflection area according to the first embodiment of the present invention.

FIG. 5 shows magnetic field distribution 17 at the y-z cross section of the horizontal magnetic deflection field with the conventional uniform magnetic field distribution, a horizontal deflection yoke 18 providing the magnetic field distribution 17, and electron beams 4', 5', and 6'. When attention is paid to lines of magnetic force indicating the magnetic field distribution, it can be seen that the lines of magnetic force bulge greatly outward to be distorted at both ends of the horizontal deflection yoke 18. This is caused because of the limited length of the practical deflection coils or the like and is unavoidable. Conventionally, therefore, such a magnetic field has been referred to as a "uniform magnetic field" without particular consideration to this aspect. In this case, since the electron beams 4', 5', and 6' are arranged in the x-z plane, they are seen as one line in the figure. Therefore, the magnetic deflection field affects the electron beams 4', 5', and 6' equally. Consequently, even if the electron beams 4', 5', and 6' pass through such a horizontal magnetic deflection field that is not considered as being perfectly uniform, the paths of the three electron beams coincide to be seen as one path continually in the y-z plane. Thus, no variation is caused in the intervals between respective adjacent imaging spots of the three electron beams in the horizontal direction.

However, a problem arises in the case of a vertical magnetic deflection field in the conventional uniform magnetic field.

Figure 6:
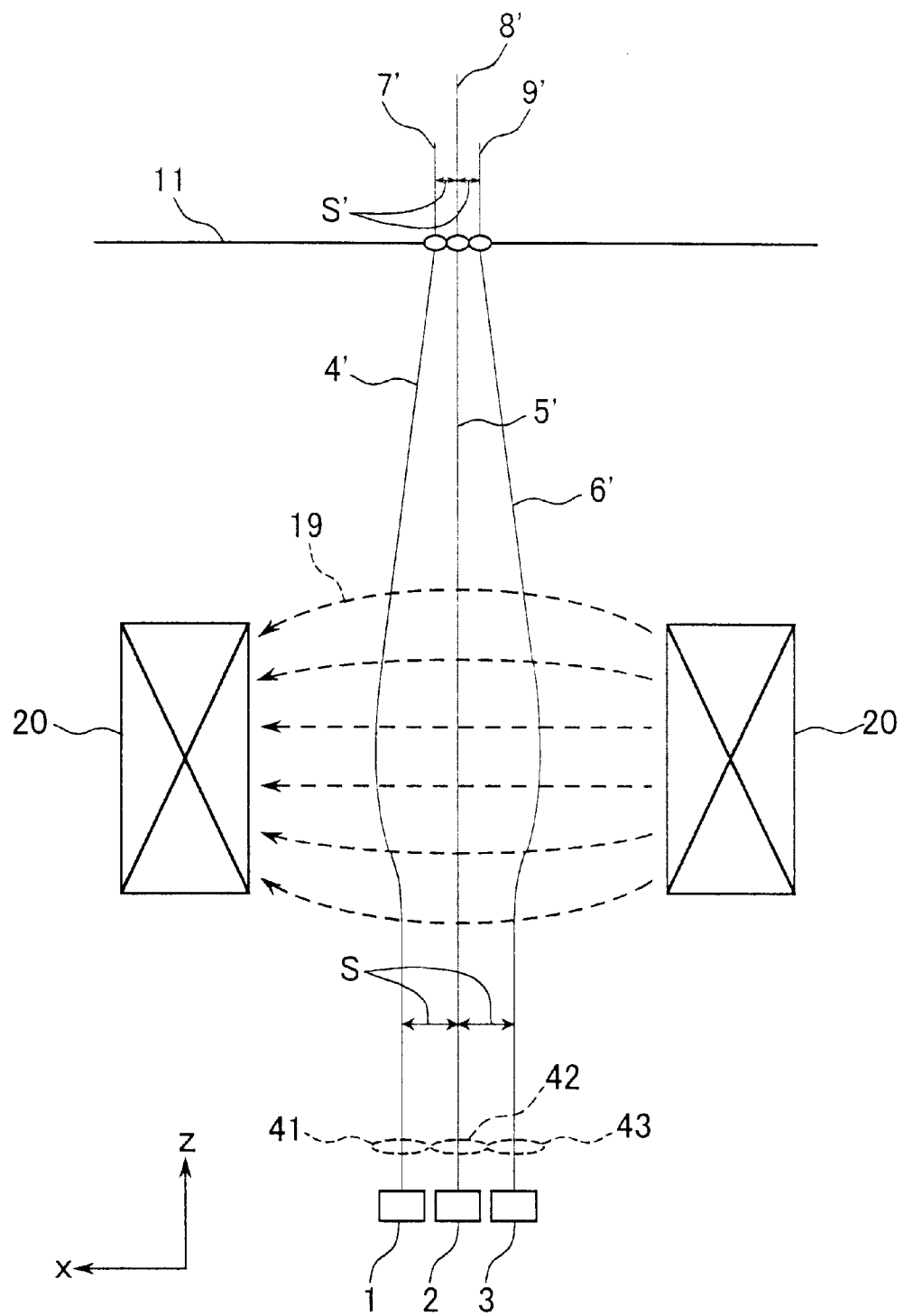
FIG. 6 is a drawing illustrating electron beam paths and magnetic field distribution at an x-z cross-section in the deflection area when uniform magnetic field distribution is not perfectly uniform.

FIG. 6 shows magnetic field distribution 19 at the x-z cross section of the vertical magnetic deflection field in the conventional uniform magnetic field, a vertical deflection yoke 20 providing the magnetic field distribution 19, electron beams 4', 5', and 6', the screen 11, and the imaging spots 7', 8', and 9'. Similarly in this case, the magnetic field is distorted as in the horizontal magnetic deflection field shown in FIG. 5. That is to say, since the electron beams 4', 5', and 6' are arranged in the x-z plane, the respective electron beams pass through the areas, of the vertical magnetic deflection field, which are different in direction of the magnetic field distribution 19 due to the bulge of the magnetic field.

In this case, the electron beam 5' passing through the center of the magnetic field distribution 19 passes through approximately uniform magnetic field distribution. However, the side electron beams 4' and 6' pass through the areas where the magnetic field distribution is curved symmetrically with respect to its center. Consequently, the paths of the electron beams 4' and 6' are refracted slightly inward by a lens effect due to the magnetic field distortion. As a result, the interval s' between the respective adjacent imaging spots 7', 8', 9' is narrower than the interval s. Further more, this tendency becomes conspicuous as the amount of the vertical deflection increases, i.e. as their positions move upward or downward with respect to the center of the screen 11.

In such a case, therefore, it is necessary to correct a displacement amount of Δs=s−s' without further disturbing the above-mentioned principle as much as possible. For this purpose, consideration may be given to a modulation method by allowing the shift amount Δt in input timings of the modulating signals 12, 13, and 14 to be synchronized with the vertical deflection amount. However, this method is not preferable because of the increase in the load on the circuit. There also is a correction method by providing barrel magnetic field distribution for vertical magnetic deflection field. However, it is not preferable in view of the principle, since this method causes a complicated design of the deflection yoke and further distortion of the magnetic field.

Figure 7:
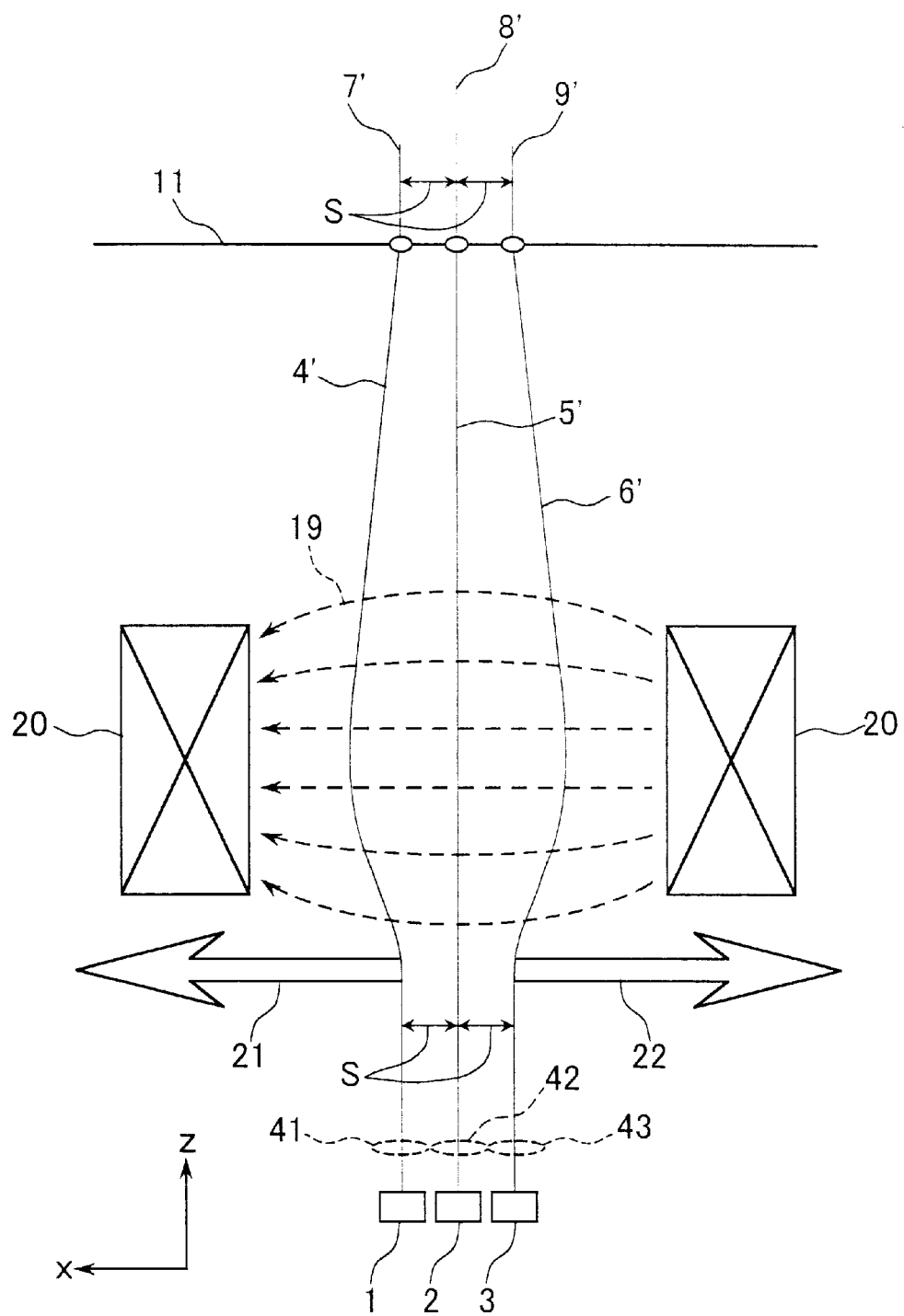
FIG. 7 is a drawing illustrating electron beam paths and magnetic field distribution at the x-z cross-section in the deflection area when a simplified dynamic convergence is employed in the color CRT apparatus according to the first embodiment of the present invention.

Another method is one providing simplified dynamic convergence, which is referred to as "YH correction". Specifically, as shown in FIG. 7, magnetic convergence field forces 21 and 22 for tilting the paths of the side electron beams 4 and 6 outward in the vicinity of the main lenses 41, 42 and 43 are set to be increased with the increase in the vertical deflection amount. According to this, the intervals between the respective adjacent imaging spots 7', 8', 9' can be corrected to be s throughout the screen 11 without disturbing the above-mentioned principal in practical use.

Therefore, it is possible to achieve the signal phase convergence with high precision without changing the shift amount Δt in input timings of the modulating signals 12, 13, and 14.

It is only necessary for the modulation of such magnetic convergence field forces 21 and 22 to rectify a part of the deflecting current applied to the vertical deflection yoke 20 and to pass it through convergence coils. The cost increase due to the employment of this simplified dynamic convergence is within a range causing no problem in practical use. Of course, for the purpose of eliminating variations in the manufacture or the like, dynamic fine adjustment of Δt can be made in addition to the above-mentioned YH correction.

Figure 8:
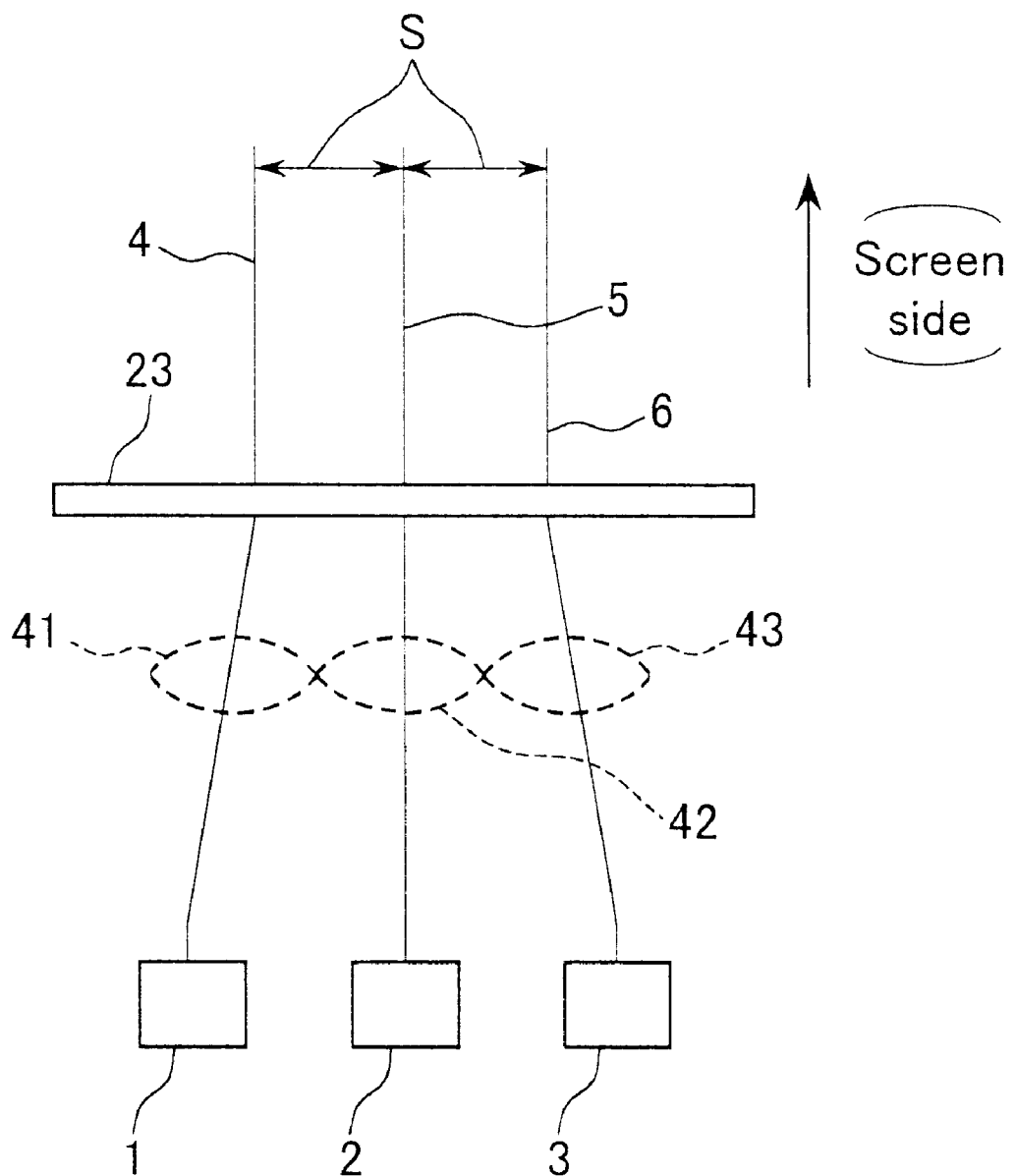
FIG. 8 is a drawing illustrating the arrangement of a quadrupole magnet for generating a quadrupole magnetic field applying outward forces to the side electron beams in the color CRT apparatus according to the first embodiment of the present invention.

As a specific means for allowing the paths of three electron beams entering the magnetic deflection field area 10 to be parallel to one another when the vertical magnetic deflection field is not generated, the electron gun itself may be designed to allow the paths of the three electron beams inside the electron gun to be approximately parallel to one another. As the other means, a quadrupole magnetic field may be provided in the space between the screen and the main lenses of the electron gun in the vicinity of the main lenses and may be statically adjusted so that the paths of the three electron beams entering the magnetic deflection field area are allowed to be parallel to one another when the vertical magnetic deflection field is not generated. Further specifically, in an electron gun whose side beams of the three electron beams travel on paths directed inward as in a conventional electron gun, a quadrupole magnet 23 is placed around the neck portion of the vacuum vessel 15 (see FIG. 1) in the space between the screen and the main lenses 41, 42, and 43 of the electron gun in the vicinity of the main lenses 41, 42, and 43 as shown in FIG. 8. This can be illustrated as in FIG. 9 when shown as a sectional model drawing of the neck portion. In this case, as the quadrupole magnet 23 to be used is formed by positioning magnets 23a, 23b, 23c, and 23d diagonally on an annular member. Using this quadrupole magnet 23, a quadrupole magnetic field 24 is generated to apply outward forces F to the side electron beams B and R, thus allowing the paths of the three electron beams to be approximately parallel to one another.

However, when such paths of the three electron beams directing inward are made parallel to one another by the quadrupole magnetic field, the intervals s between the center electron beam G and the respective side electron beams B and R increase as compared to the case where no quadrupole magnetic field is provided. As a result, the side electron beams B and R pass through the areas closer to the funnel inner face, and thus the side electron beams may strike the funnel inner face to form a dark shadow called "neck shadow" on the screen in some cases when the electron beams are deflected.

Figure 9:
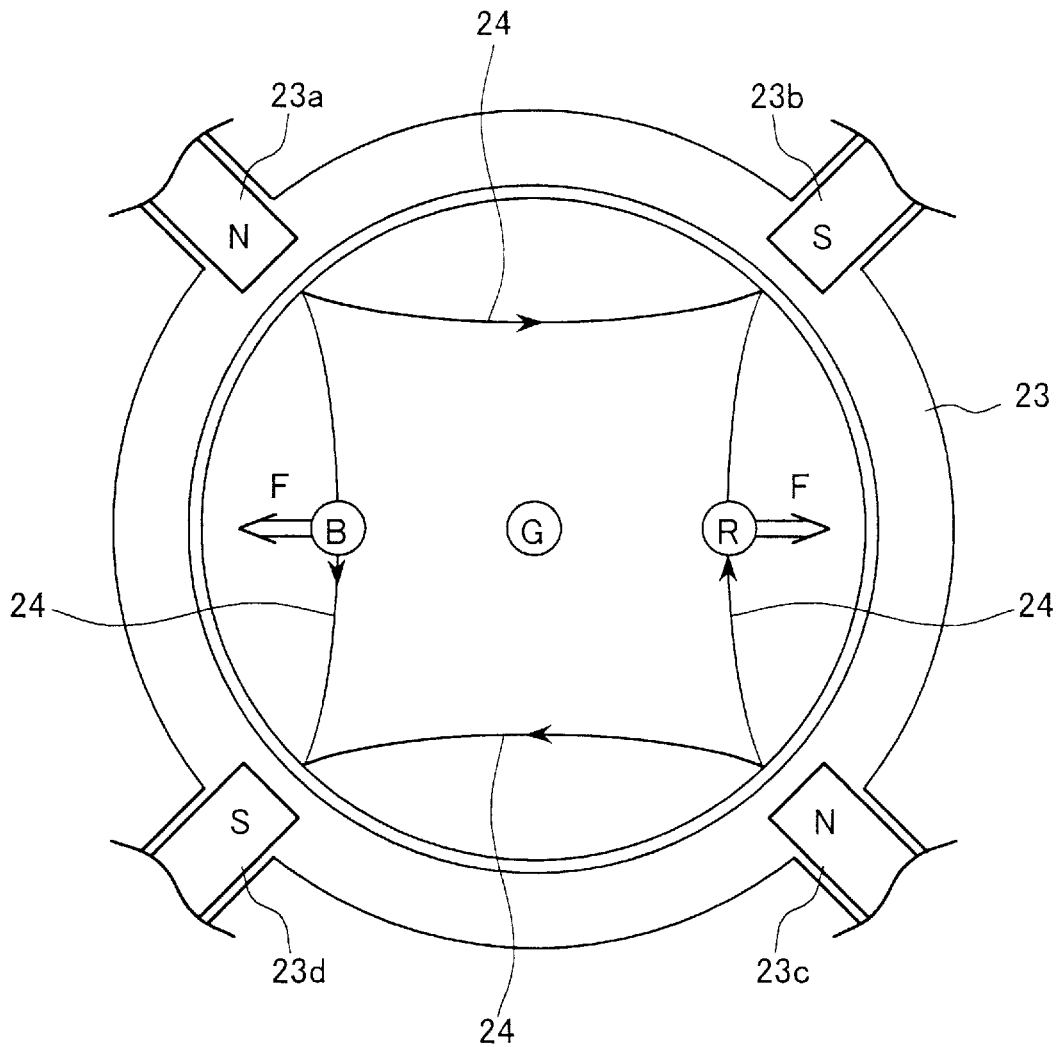
FIG. 9 is a sectional view of a neck portion illustrating the positional relationship between electron beams and the quadrupole magnetic field applying the outward forces to the side electron beams in the color CRT apparatus according to the first embodiment of the present invention.
Figure 10:
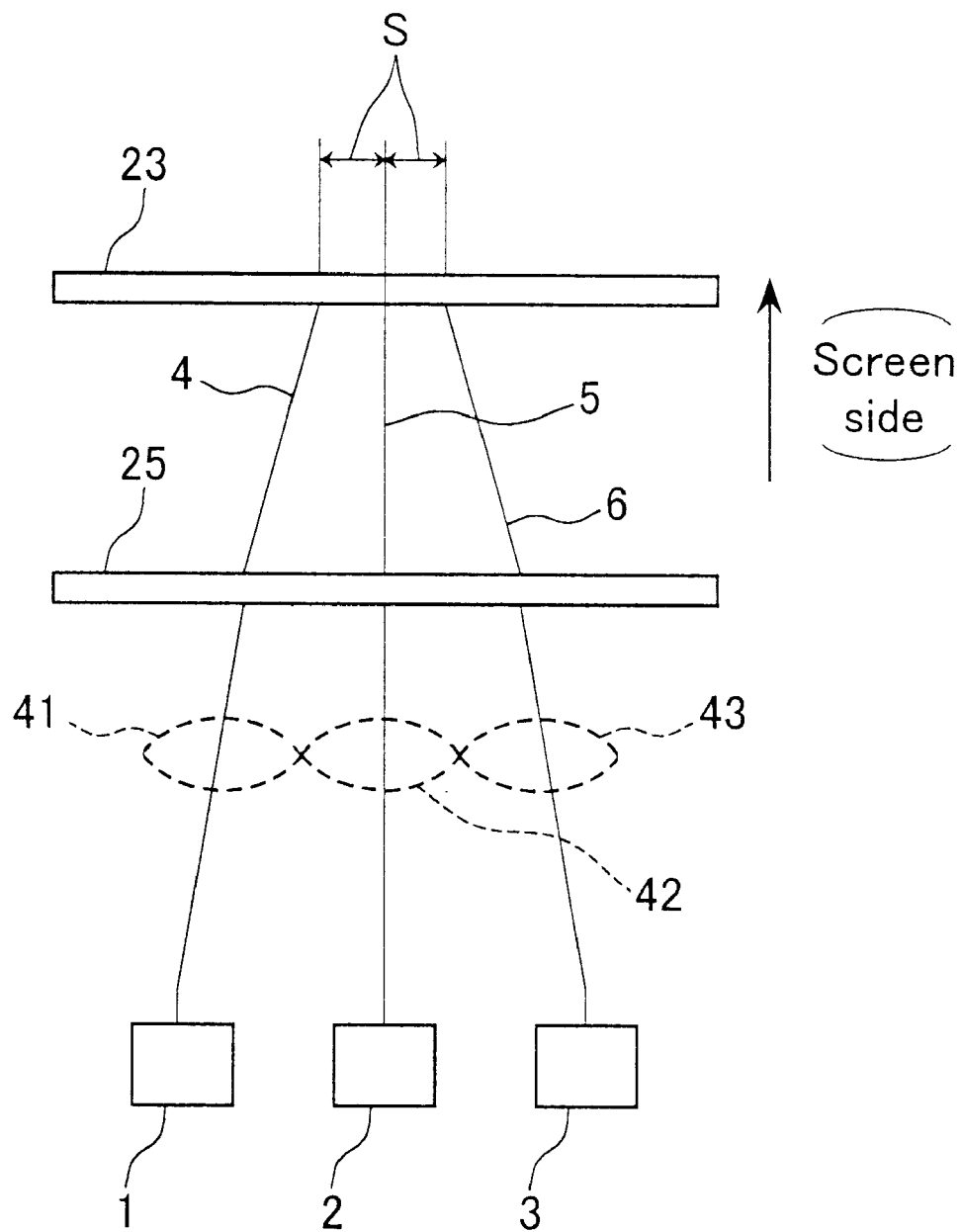
FIG. 10 is a drawing illustrating the arrangement of a quadrupole magnet for generating a first quadrupole magnetic field applying inward forces to and a quadrupole magnet for generating a second quadrupole magnetic field applying outward forces to the side electron beams in the color CRT apparatus according to the first embodiment of the present invention.
Figure 11:
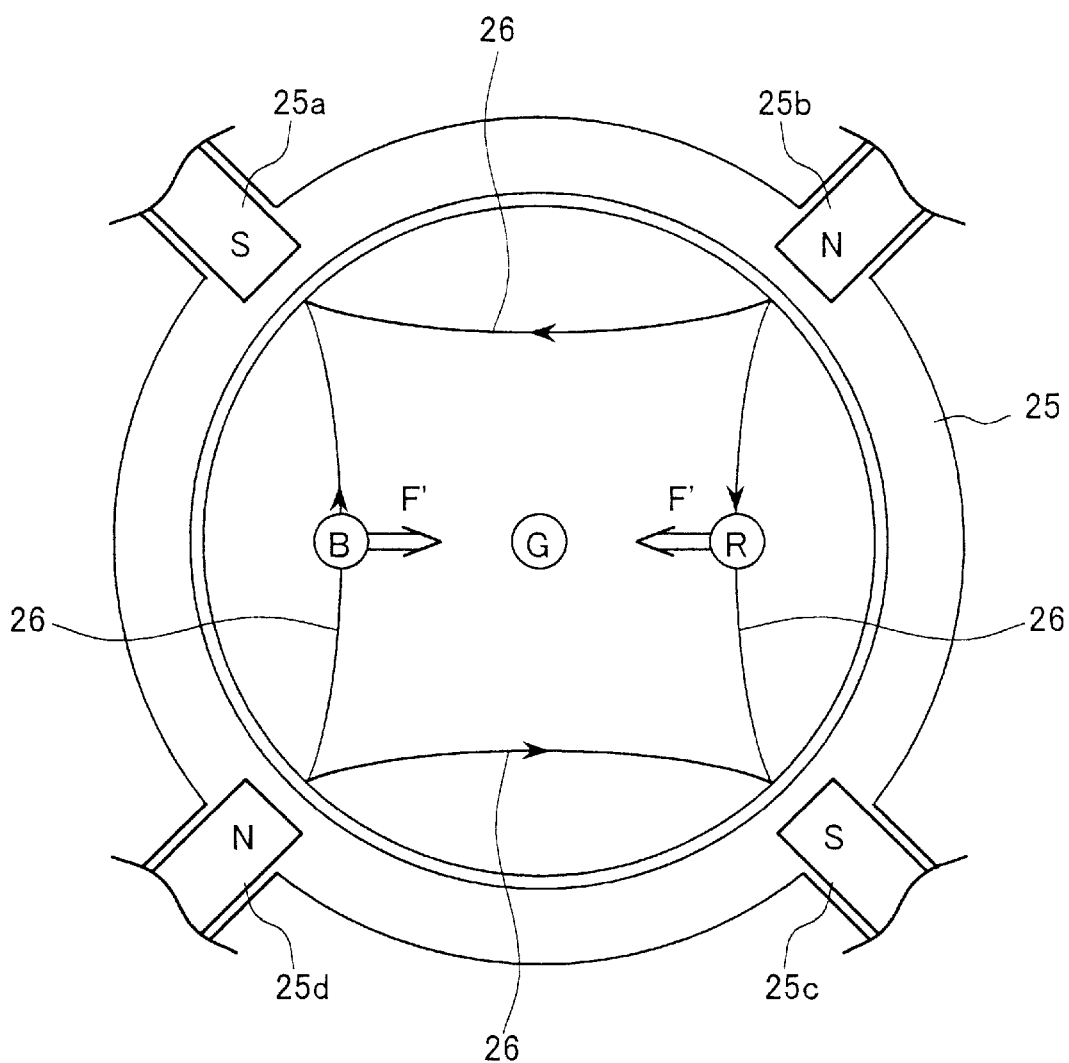
FIG. 11 is a sectional view of the neck portion illustrating the positional relationship between electron beams and the first quadrupole magnetic field applying the inward forces to the side electron beams in the color CRT apparatus according to the first embodiment of the present invention.

For a better means capable of avoiding this neck shadow, it is preferred to provide two quadrupole magnetic fields arranged in the tube axis direction on the screen side from the main lenses. As shown in FIG. 10, initially, a quadrupole magnet 25 for generating a first quadrupole magnetic field is provided in the vicinity of the main lenses 41, 42, and 43, and on the screen side therefrom, a quadrupole magnet 23 for generating a second quadrupole magnetic field is placed. As shown in FIG. 11, the quadrupole magnet 25 formed of magnets 25a, 25b, 25c, and 25d positioned diagonally on an annular member generates the first quadrupole magnetic field 26, which applies inward forces F' to the side electron beams B and R, thus distorting them further inward compared to the degree to which the three electron beams are preset to be directed inward. Then, by the quadrupole magnet 23 for generating the second quadrupole magnetic field, the aforementioned quadrupole magnet field 24 as shown in FIG. 9 is generated to apply the outward forces F to the side electron beams B and R, thus allowing the three electron beams to be approximately parallel to one another. In this case, the side electron beams come to be positioned inward by the first quadrupole magnetic field. Therefore, even when the paths of the three electron beams are positioned in parallel to one another by the second quadrupole magnetic field, the intervals s between the respective adjacent electron beams of the three electron beams decreases. Consequently, the neck shadow caused by the striking of the side electron beams on the funnel inner face is not formed when the beams are deflected. As a result, a margin in tolerance for neck shadow is obtained. Therefore, without any fear of the formation of the neck shadow, the diameters of the funnel or of the coils of the deflection yoke can be designed to be small to some degree, thus saving electric power. In addition, without any fear of the formation of the neck shadow, the deflection angle of the electron beams can be increased to achieve a wide angle. Therefore, the overall length of the color CRT can be reduced.

It is further preferable that when the first and second quadrupole magnetic fields are provided as in the above, a third quadrupole magnetic field for applying inward or outward forces to the side electron beams also is provided in the vicinity of the first or second quadrupole magnetic field. This third quadrupole magnetic field is formed by approximately the same arrangement of a quadrupole magnet around the neck portion as in the case where the first and second quadrupole magnetic fields are provided. The quadrupole magnet for generating the third quadrupole magnetic field may be positioned on the side of the main lenses from the quadrupole magnet 25 for generating the first quadrupole magnetic field, on the screen side from the quadrupole magnet 23 for generating the second quadrupole magnetic field, or between the quadrupole magnet 23 and the quadrupole magnet 25 in FIG. 10.

As described above, providing the third quadrupole magnetic field enables the correction of unbalance between the horizontal and vertical forces with respect to focusing action or lens magnification for imaging, which is caused by the first and second quadruple magnetic fields. This can suppress the distortion in spot shapes and can improve resolution. In this case, the direction of the third quadrupole magnetic field varies suitably according to the amount of correction required for the distortion of spot shapes.

Instead of providing the third quadrupole magnetic field, the electron gun may be designed to have an electrode structure allowing a quadrupole electrostatic lens to be generated inside the electron gun. Similarly, using this quadrupole electrostatic lens to apply inward or outward forces to the side electron beams B and R, the distortion of spot shapes can be suppressed.

As a specific means for generating the magnetic dynamic convergence field forces 21 and 22, a magnetic dynamic convergence field generator including a quadrupole magnet formed of electromagnetic coils is provided in the space between the screen and the main lenses of the electron gun in the vicinity of the main lenses. The magnetic dynamic convergence field generator may adjust the magnetic fields dynamically so that when the vertical magnetic deflection field is generated, the intervals between the path of the center electron beam and the respective paths of the side electron beams entering the magnetic deflection field area are increased depending on the strength of the vertical magnetic deflection field.

In addition, it is preferable that the magnetic dynamic convergence field generator using the electromagnetic coils is positioned between the first quadrupole magnetic field and the second quadrupole magnetic field. The electromagnetic coils enable the dynamic fine adjustment of the intervals between the respective adjacent electron beams. Furthermore, when such electromagnetic coils are positioned between the first quadrupole magnetic field and the second quadrupole magnetic field, the space between the first quadrupole magnetic field and the second quadrupole magnetic field can be broadened. Therefore, the paths of the electron beams can be bent inward at a small angle by the first quadrupole magnetic field. In addition, naturally the paths of the electron beams bent inward by the first quadrupole magnetic field also can be bent outward at a small angle by the second quadrupole magnetic field. Consequently, it is not required to set the first and second quadrupole magnetic fields to be very strong. This enables harmful effects on the magnetic deflection fields and the electrostatic lens generated by those quadrupole magnetic fields to be suppressed.

Second Embodiment

A second embodiment of the present invention is described as follows.

In the present embodiment, the raster distortion of a problem caused in the first embodiment is cancelled.

Figure 12:
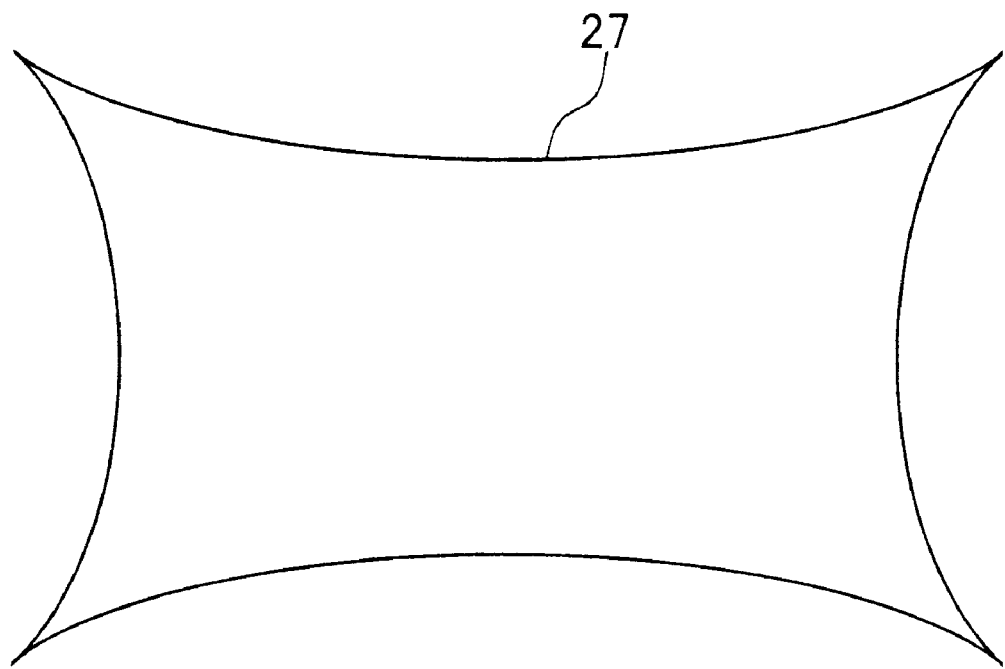
FIG. 12 is a drawing showing a raster shape in the case of deflection using uniform magnetic field distribution in the color CRT apparatus according to the first embodiment of the present invention.

In the first embodiment, the uniform magnetic field distribution and the perfectly flat screen are employed. In view of the principle, therefore, pincushion raster distortion 27 is caused in the raster as shown in FIG. 12. In order to correct this distortion without disturbing the principle of the first embodiment, a magnetic correction field also should have uniform magnetic field distribution. On the other hand, the magnetic deflection field has uniform magnetic field distribution, which therefore enables a uniform magnetic field simply to be superimposed as the correction magnetic field.

Figure 13:
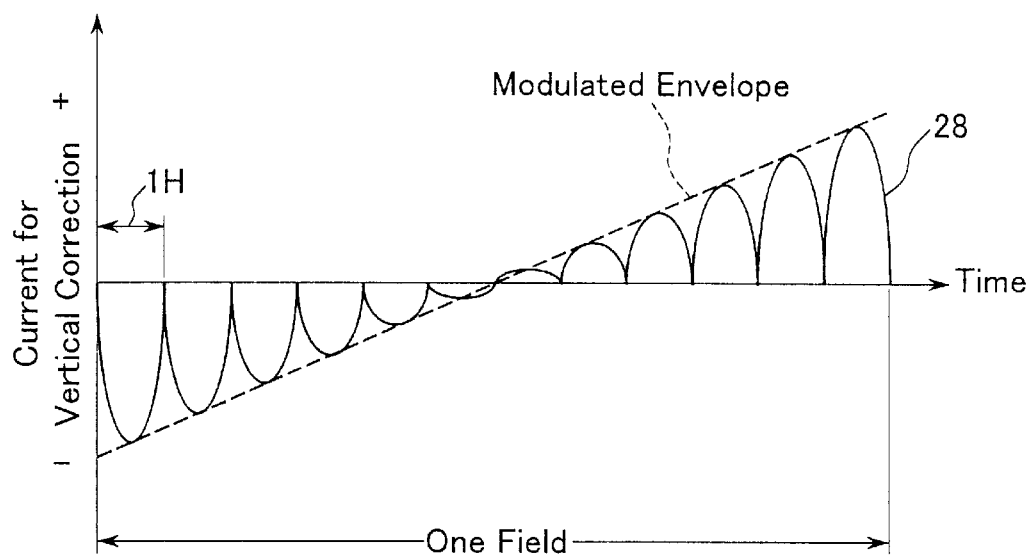
FIG. 13 is a diagram showing a current waveform for generating a correction magnetic field in a vertical direction in a color CRT apparatus according to a second embodiment of the present invention.

Concave portions in the upper and lower portions of the raster are corrected by the generation of an auxiliary vertical magnetic deflection field with uniform magnetic field distribution. As a correction current 28 for generating the auxiliary vertical magnetic deflection field, one is used in which the amplitude of the envelope of curves repeated on the basis of a horizontal deflection period 1H as one period is modulated by the vertical deflection current of the original deflection (i.e. not the deflection for correction) over one field as shown in FIG. 13. According to this, the amplitude with curves increases according to the vertical deflection amount when by the original deflection, the electron beams scan the center portion in the x direction on the screen, thus compensating for the lack of deflection amount in the concave portions in the upper and lower portions of the raster. This correction current may be superimposed on the vertical deflection current passed through the vertical deflection yoke, or may be applied to a vertical magnetic field compensator for generating uniform magnetic field distribution, which is provided separately from the vertical deflection yoke.

Figure 14:
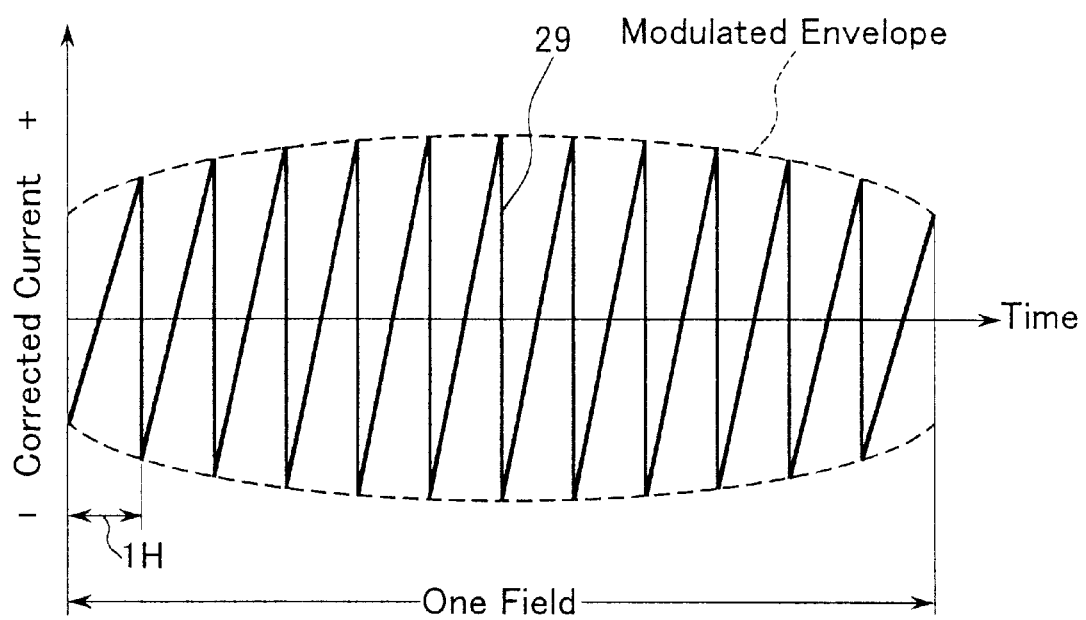
FIG. 14 is a diagram showing a corrected horizontal deflection current waveform in the color CRT apparatus according to the second embodiment of the present invention.

In the correction to the concave portions in the left and right portions of the raster, the horizontal deflection current itself, which is passed through the horizontal deflection yoke, is used as a corrected current 29 shown in FIG. 14, i.e. the amplitude of the envelope is modulated to have a curve in one field taken as one period, thus compensating for the lack of deflection amount in the concave portions in the left and right portions of the raster.

According to this, the pincushion raster distortion can be corrected without disturbing the principle of the first embodiment. Since uniform magnetic fields alone are superimposed, only the magnitude of Bx varies and the forms of the formulae (1) and (2) do not change. Therefore, the convergence is not affected.

Third Embodiment

A third embodiment of the present invention is described as follows.

The present embodiment solves the problem of the decrease in precision in phase convergence of three colors R, G, and B on the screen when geometric variations including those in size, linearity and shift of the raster are caused with the passage of time in the first embodiment.

The principle of the first embodiment holds when the ratio of the intervals s to the size, linearity, or shift of the raster is constant. Therefore, in the initial state with the variation or deformation in geometric forms such as the size, linearity and shift of the raster, it is required to adjust the phase convergence of the three colors R, G, and B at each position on the screen by adjusting the shift amount $\Delta t$ in the input timings of the modulating signals 12, 13, and 14. However, after such adjustment, variations in size, linearity and shift of the raster possibly may be caused with the passage of time due to temperature characteristics of the deflection yoke or the like. When such phenomena occur, the ratio of the intervals s between respective adjacent beam imaging spots to the size, linearity or shift determining local sizes of the raster is changed, thus damaging the principle of the first embodiment. Therefore, in such a case, the geometric variations in the horizontal direction of the raster may be detected by any means, which then may be fed back to the shift amount $\Delta t$ in the input timings of the modulating signals 12, 13, and 14.

Figure 15:
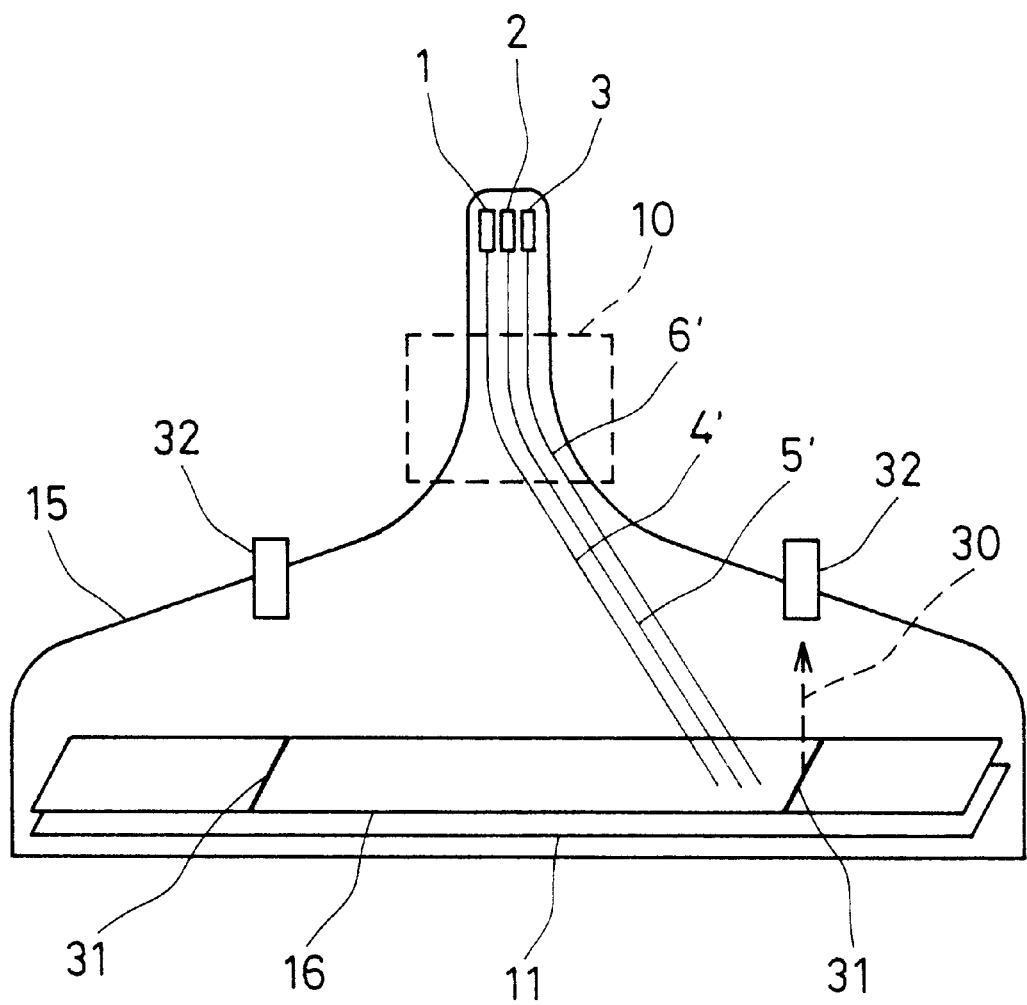
FIG. 15 is a structural view of a color CRT apparatus according to a third embodiment of the present invention.

FIG. 15 shows a specific example of the means for detecting the geometric variations in the raster and feeding it back to the shift amount $\Delta t$. To the surface on the side of the electron sources 1, 2, and 3, of the shadow mask 16 provided approximately in parallel to the screen 11 inside the vacuum vessel 15, phosphors 31 emitting visible light or invisible light 30 such as ultraviolet light upon being struck by electron beams are applied in a vertical linear form. An optical sensor 32 such as a photo multiplier sensing the emission of the phosphors is provided on the inner or outer face of the vacuum vessel. When the respective electron beams 4', 5', and 6' during the horizontal scanning pass on the phosphors 31 at a time difference $\Delta t$, the emission of the phosphors are caught by the optical sensor 32 at the time difference $\Delta t$. Based on this $\Delta t$, the input timings of the modulating signals are determined. The fine adjustment in each position on the screen 11 increases with the increase in number of places where the phosphors 31 and the optical sensors 32 are placed as pairs.

According to this, the variations in the size, linearity and shift of the raster with the passage of time can be fed back to $\Delta t$. Thus, the precision in the signal phase convergence can be kept constant continually.

Fourth Embodiment

Next, a fourth embodiment of the present invention is described as follows.

In the present embodiment, the description is directed to a means for resetting the $\Delta t$ automatically when the setting of the number of pixels of display data or the field frequency is changed in the first embodiment. For example, in the case of a computer monitor, when the setting (display mode) of the number of pixels (the number of horizontal dots×the number of vertical dots) of display data is changed from SVGA (800×600) to UXGA (1600×1200) at the user end, horizontal scanning line is doubled, i.e. horizontal scanning speed is doubled when the field frequency (a frame frequency in the case of no interlace) is constant. Therefore, the value of Δt required for appropriate signal phase convergence is reduced to half. In such a case, it is possible to cope with the change by applying automatic feed back with such a means in the third embodiment. However, since the variations in Δt are great, it is preferred to cope with it in setting beforehand. In the present embodiment, therefore, when the reset of the above-mentioned display mode is input in software, the value of Δt is reset according to the input by, for example, means such as rewriting of driver software in a graphic board or the like.

This enables an automatic reset of Δt when the setting of the number of pixels of display data or the field frequency is changed, thus keeping the precision in signal phase convergence constant continually.

The aforementioned embodiments employed examples using a color CRT apparatus in which electron beams scan the screen in the horizontal direction. However, even with a color CRT apparatus in which the screen is scanned in the vertical direction, the present invention can be applied by changing the term "horizontal" to "vertical" and vice versa in the above description.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A color CRT apparatus, comprising a system in which three electron beams, including side electron beams and a center electron beam, emitted from three electron sources arranged in an in-line form in a horizontal direction corresponding to three colors R, G, and B are deflected by a horizontal magnetic deflection field and a vertical magnetic deflection field in a magnetic deflection field area, imaging spots of the three electron beams that are not superimposed on one point on a screen at a time are formed, and according to a time difference in timings at which the three electron beams scan the same one point on the screen, respectively, a time difference is applied to input timings of modulating signals for the respective electron beams to form color images on the screen, wherein the screen is substantially flat, both the horizontal magnetic deflection field and the vertical magnetic deflection field have substantially uniform magnetic field distribution, paths of the side electron beams and a path of the center electron beam are approximately parallel to each other when the electron beams enter the magnetic deflection field area, and the time difference applied to the input timings of the modulating signals is approximately constant throughout the screen.

2. A color CRT apparatus, comprising a system in which three electron beams, including side electron beams and a center electron beam, emitted from three electron sources arranged in an in-line form in a horizontal direction corresponding to three colors R, G, and B are deflected by a horizontal magnetic deflection field and a vertical magnetic deflection field in a magnetic deflection field area, imaging spots of the three electron beams that are not superimposed on one point on a screen at a time are formed, and according to a time difference in timings at which the three electron beams scan the same one point on the screen, respectively, a time difference is applied to input timings of modulating signals for the respective electron beams to form color images on the screen, wherein the screen is approximately flat, both the horizontal magnetic deflection field and the vertical magnetic deflection field have approximately uniform magnetic field distribution, and adjustment is made so that the imaging spots of the three electron beams on the screen at a time are positioned continually at a certain interval between respective adjacent two of the imaging spots in a horizontal direction by allowing paths of the side electron beams and a path of the center electron beam to be approximately parallel to each other when the electron beams enter the magnetic deflection field area and the vertical magnetic deflection field is not generated and by increasing, according to strength of the vertical magnetic deflection field, intervals between the paths of the side electron beams and the path of the center electron beam when the electron beams enter the magnetic deflection field area and the vertical magnetic deflection field is generated.

3. The color CRT apparatus according to claim 1, wherein paths of the three electron beams inside an electron gun are approximately parallel to one another.

4. The color CRT apparatus according to claim 2, wherein a quadrupole magnetic field is provided in a space between the screen and main lenses of an electron gun in the vicinity of the main lenses and is adjusted statically so that the paths of the three electron beams entering the magnetic deflection field area are parallel to one another when the vertical magnetic deflection field is not generated.

5. The color CRT apparatus according to claim 4, wherein the quadrupole magnetic field includes a first quadrupole magnetic field and a second quadrupole magnetic field, which are provided sequentially in the space between the screen and the main lenses of the electron gun in the vicinity of the main lenses, the first quadrupole magnetic field bends the paths of the side electron beams of the three electron beams inward, and the second quadrupole magnetic field allows the paths of the three electron beams to be parallel to one another.

6. The color CRT apparatus according to claim 5, wherein a third quadrupole magnetic field is provided in the vicinity of the first quadrupole magnetic field or the second quadrupole magnetic field to bend the paths of the side electron beams inward or outward.

7. The color CRT apparatus according to claim 5, wherein a quadrupole electrostatic lens is provided inside the electron gun to bend the paths of the side electron beams inward or outward.

8. The color CRT apparatus according to claim 2, wherein a quadrupole magnetic field generated by electromagnetic coils is provided in a space between the screen and main lenses of an electron gun in the vicinity of the main lenses and is adjusted dynamically so that when the vertical magnetic deflection field is generated, the intervals between the paths of the side electron beams and the path of the center electron beam entering the magnetic deflection field area are increased according to strength of the vertical magnetic deflection field.

9. The color CRT apparatus according to claim 5, wherein a quadrupole magnetic field generated by electromagnetic coils is provided between the first quadrupole magnetic field and the second quadrupole magnetic field and is adjusted dynamically so that when the vertical magnetic deflection field is generated, the intervals between the paths of the side electron beams and the path of the center electron beam entering the magnetic deflection field area are increased according to the strength of the vertical magnetic deflection field.

10. The color CRT apparatus according to claim 1, wherein raster distortion in the color images is corrected by the uniform magnetic field distribution or by an auxiliary magnetic field provided for the uniform magnetic field distribution in an auxiliary manner.

11. The color CRT apparatus according to claim 1, wherein the time difference in the input timings is adjusted according to variations in current level of the electron beams.

12. The color CRT apparatus according to claim 1, wherein geometric variations in the color images with the passage of time are detected with a sensor and the time difference in the input timings is adjusted according to an amount of the variations.

13. The color CRT apparatus according to claim 1, wherein the time difference in the input timings is adjusted according to settings of a field frequency and/or the number of pixels of display data of the color images.

14. The color CRT apparatus according to claim 2, wherein paths of the three electron beams inside an electron gun are approximately parallel to one another.

15. The color CRT apparatus according to claim 2, wherein raster distortion in the color images is corrected by the uniform magnetic field distribution or by an auxiliary magnetic field provided for the uniform magnetic field distribution in an auxiliary manner.

16. The color CRT apparatus according to claim 2, wherein the time difference in the input timings is adjusted according to variations in current level of the electron beams.

17. The color CRT apparatus according to claim 2, wherein geometric variations in the color images with the passage of time are detected with a sensor and the time difference in the input timings is adjusted according to an amount of the variations.

18. The color CRT apparatus according to claim 2, wherein the time difference in the input timings is adjusted according to settings of a field frequency and/or the number of pixels of display data of the color images.

* * * * *